US011864642B1

(12) United States Patent
Kinney

(10) Patent No.: US 11,864,642 B1
(45) Date of Patent: Jan. 9, 2024

(54) SECURE DIAMOND SMART CARDS AND EXCHANGE SYSTEMS THEREFOR

(71) Applicant: Diamond Standard Inc., New York, NY (US)

(72) Inventor: Cormac L. Kinney, New York, NY (US)

(73) Assignee: DIAMOND STANDARD INC., New York, NY (US)

( * ) Notice: Subject to any disclaimer, the term of this patent is extended or adjusted under 35 U.S.C. 154(b) by 567 days.

(21) Appl. No.: 16/774,896

(22) Filed: Jan. 28, 2020

Related U.S. Application Data

(63) Continuation of application No. 16/457,661, filed on Jun. 28, 2019, now Pat. No. 10,709,221, which is a
(Continued)

(51) Int. Cl.
  *G06Q 30/018* (2023.01)
  *A45C 11/16* (2006.01)
  (Continued)

(52) U.S. Cl.
  CPC .............. *A45C 11/16* (2013.01); *A45C 13/18* (2013.01); *B42D 25/36* (2014.10); *B65B 5/12* (2013.01);
  (Continued)

(58) Field of Classification Search
  None
  See application file for complete search history.

(56) References Cited

U.S. PATENT DOCUMENTS

| 2,144,336 A | 1/1939 | Morris |
| 3,406,821 A | 10/1968 | Weissberg |

(Continued)

FOREIGN PATENT DOCUMENTS

| WO | 2013078484 A1 | 5/2013 | |
| WO | WO-2013078484 A1 * | 5/2013 | ............. A45C 11/16 |

OTHER PUBLICATIONS

How to spot a fke diamond; Jun. 29, 2015; The Loupe; (https://www.truefacet.com/guide/spot-fake-diamond/. Last access Feb. 10, 2023.).*

*Primary Examiner* — Peter Ludwig
*Assistant Examiner* — Donald J Edmonds
(74) *Attorney, Agent, or Firm* — Perkins Coie LLP; Bailey Meyer

(57) ABSTRACT

A tamperproof diamond package comprises a package body; at least one chip embedded in the package body and at least one antenna configured to enable communication with the chip; anti-counterfeiting visual impressions on the package body; a diamond pouch formed at a predetermined section within the package body; and one or more diamonds located inside the diamond pouch and an outer covering encasing the package body and configured to reveal any tampering with the one or more diamonds located in the diamond pouch. The diamond package can be credit card shaped and also contains serial number and website information and be provided in nominal dollar values. An associated diamond exchange system utilizes the diamond packages and provides a registration server which stores unique identifying information that enable interrogating the individual diamond packages and checking their authenticity with the registration server.

15 Claims, 13 Drawing Sheets

Related U.S. Application Data continuation of application No. 14/619,633, filed on Feb. 11, 2015, now abandoned.

(51) Int. Cl.
  *B42D 25/36* (2014.01)
  *A45C 13/18* (2006.01)
  *B65D 25/20* (2006.01)
  *B65B 5/12* (2006.01)
  *B65B 55/20* (2006.01)
  *B65B 61/26* (2006.01)
  *B65B 11/50* (2006.01)
  *B65D 77/02* (2006.01)

(52) U.S. Cl.
  CPC .............. *B65B 11/50* (2013.01); *B65B 55/20* (2013.01); *B65B 61/26* (2013.01); *B65D 25/205* (2013.01); *B65D 77/02* (2013.01); *G06Q 30/0185* (2013.01)

(56) References Cited

U.S. PATENT DOCUMENTS

| | | |
|---|---|---|
| 3,957,157 A | 5/1976 | Therrien |
| 4,063,639 A | 12/1977 | Grant |
| 4,275,810 A | 6/1981 | Waldmeier |
| 4,320,831 A | 3/1982 | Szabo et al. |
| 4,364,472 A | 12/1982 | Waldmeier |
| 4,466,534 A | 8/1984 | Dunn |
| 4,595,095 A | 6/1986 | Lam |
| 4,646,914 A | 3/1987 | Gipson |
| 4,915,214 A | 4/1990 | Wieder |
| 5,133,451 A | 7/1992 | Boyd et al. |
| 6,683,680 B2 | 1/2004 | Dinu et al. |
| 7,997,789 B2 | 8/2011 | Smith et al. |
| 8,516,269 B1* | 8/2013 | Hamlet ................. G06F 21/445 713/180 |
| 8,789,251 B2 | 7/2014 | Labow |
| 9,767,527 B2 | 9/2017 | Neuman |
| 2003/0223054 A1* | 12/2003 | Warwick .......... G06K 19/06037 356/30 |
| 2006/0105053 A1 | 5/2006 | Marx et al. |
| 2006/0164623 A1* | 7/2006 | Wagner .............. G06Q 30/0631 356/30 |
| 2009/0070238 A1* | 3/2009 | Moryto .................. G06Q 30/02 705/28 |
| 2009/0083833 A1* | 3/2009 | Ziola ...................... G06F 21/31 726/2 |
| 2010/0073147 A1* | 3/2010 | Guajardo Merchan ..................... G06K 19/07309 340/10.51 |
| 2011/0099117 A1* | 4/2011 | Schepers ................ G06F 21/35 705/318 |
| 2011/0146211 A1* | 6/2011 | LaTrobe ................ A47F 7/024 53/467 |
| 2012/0179517 A1* | 7/2012 | Tang .................. G06Q 30/0185 705/318 |
| 2012/0179614 A1* | 7/2012 | Tang .................. G06Q 30/0185 705/318 |
| 2012/0319815 A1* | 12/2012 | Feldman .................. G01S 5/04 340/5.8 |
| 2013/0142329 A1* | 6/2013 | Bell ...................... H04L 9/0866 380/44 |
| 2013/0247432 A1* | 9/2013 | Droz ...................... A44C 15/00 40/124.06 |
| 2015/0081506 A1 | 3/2015 | Neuman |
| 2015/0307253 A1 | 10/2015 | Paoli |
| 2016/0174675 A1 | 6/2016 | Bedman et al. |

\* cited by examiner

SECURE DIAMOND SMART CARDS AND EXCHANGE SYSTEMS THEREFOR

CROSS-REFERENCE TO RELATED APPLICATION(S)

This application is a continuation application of U.S. Non-Provisional patent application Ser. No. 16/457,661, filed Jun. 28, 2019, which claims benefit of and priority to Non-Provisional patent Ser. No. 14/619,633, filed Feb. 11, 2015, which claims benefit to Provisional Patent Ser. No. 61/938,923 filed Feb. 12, 2014 and Provisional Patent Ser. No. 62/022,365 filed on Jul. 9, 2014, the contents of all of which are incorporated herein by reference.

BACKGROUND OF THE INVENTION

The present invention is directed to a system and method for authenticating and tracking expensive objects and, more particularly, to a system and method of packaging, trading, and creating a marketplace for standardized value, precious stone packages and to various security authentication features and elements related thereto.

The world stock trading exchanges provide a very easy and convenient medium for issuing and trading in company shares. It is also easy to trade in certain well-known coins or in standardized bars of gold and the like. Their value can be easily traded and no specific or particularly difficult authentication processes of the merchandise is necessary.

This is not so at all with respect to precious stones, particularly diamonds. The prices of seemingly identical diamonds can vary in price considerably. Valuation of diamonds cannot be done on the spot. Authentication of diamonds that are actively traded poses an especially serious problem of authentication, including the substitution of fake or non-genuine diamonds for real diamonds, given the thousands of dollars price tag of individual diamonds. There is a need and desire in the marketplace for technology and a system that enable rapid, secure and impersonal exchanges that permit the purchase of diamonds in a very reliable and secure manner.

Presently, creating a marketplace in diamonds is compromised by counterfeit items in the supply chain or channels. The possibility of counterfeits creates the potential for unacceptable losses to purchasers, causing friction in trade and limiting the market to few sophisticated participants. What is needed is a way for customers to reliably authenticate the item, i.e., a standardized package of diamonds, before purchase, using technology widely in use by consumers worldwide, namely through the use of an Internet-ready cell phone. A second difficulty with creating a marketplace for diamonds is that owners may typically want to store their diamond merchandise with a third party, for example, a diamond warehouse, but require an authentic, convenient and highly reliable system for ascertaining that the specific goods are being held as agreed, without relying on the naked assurance of a third party alone. The creation and wide acceptance of such diamond exchanges and markets would further benefit from introducing standardized diamond packs of known or nominal monetary values that could be purchased and/or exchanged in unitary quantities without much regard to the parameters of the individual diamonds in each pack. Such a standardized marketplace product(s) would enable people to invest their assets in standardized diamond packets knowing that these assets are highly liquid and easily sold, traded, and/or converted to other asset categories.

SUMMARY OF THE INVENTION

Accordingly, it is an object of the present invention to provide a marketplace for diamonds that is highly secure and reliable.

It is another object of the invention to provide a diamond packaging format that is extremely secure and totally invulnerable to tampering with the diamond merchandise stored therein.

It is yet another object of the invention to provide a worldwide, Internet accessible system and marketplace for exchanging diamonds based on standardized values of diamond packets.

The foregoing and other objects of the invention are realized with a system and method that processes and handles tamperproof diamond packages wherein each diamond package includes: a package body; at least one PUF (physical unclonable function) chip embedded in the package body and at least one antenna configured to enable communication with the PUF chip; anti-counterfeiting visual impressions on the package body; a diamond pouch formed at a predetermined section within the package body; and one or more diamonds located inside the diamond pouch and an outer covering encasing the package body and configured to reveal any tampering with the one or more diamonds located in the diamond pouch.

In preferred embodiments, the package body comprises a thin, credit card shaped body with a thickness that is not greater than 0.25 other dimensions associated with the package body. Further, the body shape is rectangular and includes at least a serial number and website information that directs a user to a website that is configured to enable checking the authenticity of the diamond packages. Preferably, the diamond packages have a nominal dollar value that can be $10,000.00, $40,000.00, and/or $100,000.00. Other nominal values are, of course, possible.

To further prevent tampering or counterfeiting of the diamond packages, the body can include a distribution of microspheres that create a unique visual image in each package that is different from any other image on any other diamond package. The microspheres can be produced from natural or synthetic materials and can be made of glass, a polymer or ceramic material.

A diamond exchange system according to the invention operates in combination with the diamond packages and includes one or more entities that package and make available the diamond packages and a registration server that stores unique identification information for each of the diamond packages and provides an interface to members of the public that enable providing to the registration server responses to interrogation signals submitted to any given diamond package. The registration server is also enabled to carry out an authentication process that verifies the authenticity of the given diamond package. The system may also include an auxiliary verification server that is configured to enable accessing diamond authenticity certificates that identify the features of the diamonds in the given diamond package. The system may also include an inventory warehouse, an associated server, as well as a further server that provides current pricing information.

Other features and advantages of the present invention will become apparent from the following description of the invention that refers to the accompanying drawings.

DETAILED DESCRIPTION OF THE DRAWINGS

Figure 1:
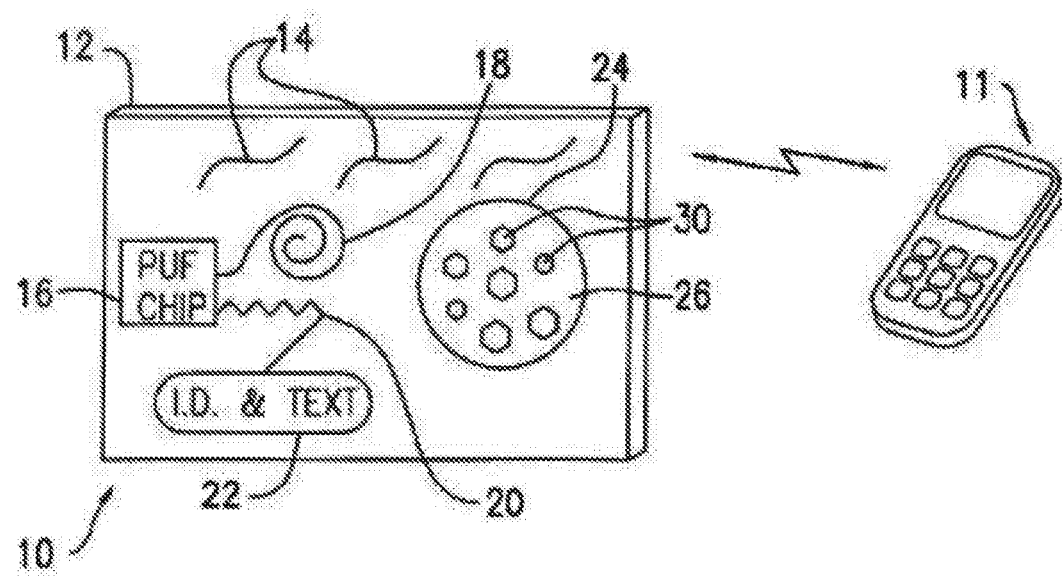
FIG. 1 is a schematic of a smart card style diamond package.

Referring to FIG. 1, the diamond card 10 of the present invention comprises a generally rectangular, credit card shape device which is relatively thin and which has a body 12 with embedded visual patterns 14 that prevent counterfeiting. Also embedded in the card 10 is a PUF chip 16 which can be interrogated via first and second antennae 18 and 20 that enable communication and interrogation via the mobile device 11 as further described below. The interrogation can be via NFC (near field communication) and/or RFID (radio frequency identification) interfaces in well-known manner. The diamond package 10 also includes visual identification information 22, for example, serial number, bar code and other descriptive information. One portion of the body 12 defines a transparent pouch 26 in which are visibly housed diamonds 30 at a thickened portion 24 of the diamond package 10.

A key feature is the PUF chip 16. For this invention, one can utilize the PUF chip provided by Verayo Technologies, which operates under U.S. Pat. No. 7,681,103 ("Reliable Generation of a Device That Has Specific Value"). The contents of U.S. Pat. No. 7,681,103 are incorporated by reference herein. The technology of PUF chips has been developing over a number of years and is also described in U.S. Patent Publication Nos. 2010/0122093; 2003/0063772; 2010/0121315; 2008/0237506; and 2008/0112596. The entire contents of said patent publications (identified in the preceding sentence) are incorporated by reference herein.

As is known, at a microscopic level, no two silicon PUF chips are identical. Unavoidable and uncontrollable variations at the molecular scale make each chip unique. The micro variations are detected and registered for the encrypted authentication process, as more fully described further on. Each chip provides a unique algorithmic response to random challenges.

In accordance with well-known technology, these chips can be interrogated by a mobile device, e.g., the mobile device 11, which contains the appropriate interrogation software, including by communicating with the diamond package 10 via an NFC interface to the PUF chip. An NFC interface enables communication at a close proximity (0-5 inches) via wireless transceivers, already known from their application in smart phones for authentication or check-in or check-out of individual units. A purchaser of the diamond card 10 can then transmit a challenge to receive a response from the PUF chip and verify that response with a third party.

The authentication can be via an RFID interface as well, which enables communication at a slightly larger distance of approximately 0-50 inches via the wireless transceivers. It too can be used for authentication and inventory taking of a large number of items in a particular warehouse location or container.

The smart phone 11 can utilize cellular or WiFi connectivity and interface to the PUF chip 16 and authenticate the diamond card 10, by communicating with the third-party server via known publicly encrypted communication methods.

The authentication server in such a case would maintain a secure and encrypted database of unique chip parameters. These parameters include the activation and unique challenge/response algorithm for every PUF chip registered at the server. The server will generate a random challenge for each chip upon presentation and confirm the expected encrypted response. Spoofs of PUF chips cannot be prepared because the challenge is random. In addition, the authentication server may have a reference photograph of the physical placement of the diamonds on the given diamond card, whereby a visual inspection and confirmation of authenticity provides additional protection.

The etched serial number 36 (FIG. 2a) on the authenticated diamond card 10 can be utilized for inventory tracking by consumers and further facilitates identification.

The invention can also include providing a locked cabinet space which is fitted with an internal RFID transceiver; shelving, containers and is dimensionally supportive of reliable RFID scanning of a quantity of RFID tags, with transceiver(s) connected to an authenticated internet board. The cabinet may include unique PUF chip or chips known to the authentication server which can be all verified through the internet.

Figure 2A:
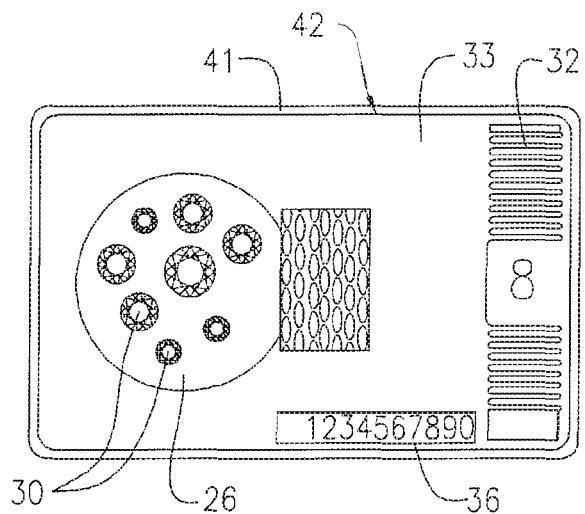
FIG. 2A shows a pictorial rendition of a diamond smart card package from the front view thereof.

Referring to FIG. 2a, this embodiment of a diamond card 42 has a front face 41 with a visual pattern 32 and an embedded PUF chip 33 and its related antennae, as well as a diamond pouch 26 in which are embedded eight diamonds. The diamonds 30 are encapsulated by an outer clear/transparent plastic or glass, with front and rear plastic or glass layers. Also note the visual serial number 36. The front face 41 of the card 42 shows the table and crown facets of the diamonds 30.

Figure 2B:
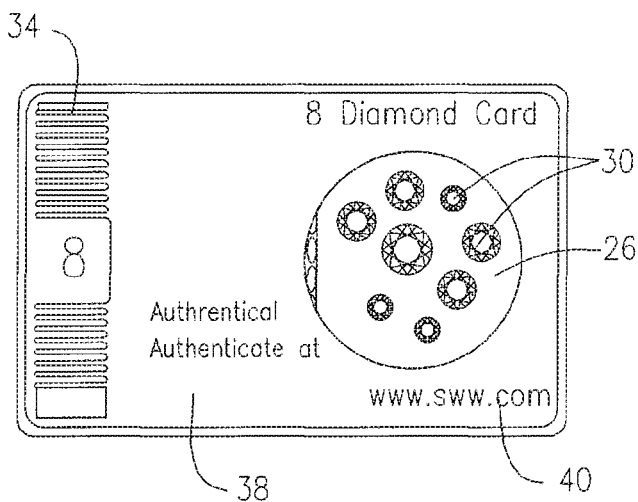
FIG. 2B shows the rear view of the smart card diamond package of FIG. 2A.

Referring to FIG. 2b, there is also shown a similar layout with additional information including multiple language instructions 38 directing users/owners to "authenticate" the package at the identified trusted website, for example, www.sww.com, at which the registration information and authentication data is available.

Figure 2C:
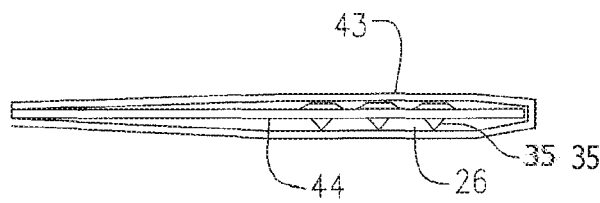
FIG. 2C shows a thickness cross-section of the diamond smart card package.

In the cross-sectional view of FIG. 2c, it can be seen that the diamonds 30 are held in openings in a central sheeting material 44 and the thickened portion 43 of the card 42 where the diamond pocket 35 is defined.

In general, the diamond smart card 42 of FIG. 2a is preferably formed in an ISO 7810 format with the two passive wireless powered integrated circuits and antennas, preferably with a package size of about 85.6 mm×54 mm×1 mm. Various additional security measures may be provided, for example, laser inscription and hologram technology may be provided on the card surface, including adjacent to or inside the diamond pocket 35, whereby any attempt to tamper with the contents as by attempting to replace the diamonds with different diamonds would be futile. The basic card and diamonds are inserted into a 7-10 mil plastic sleeve, heat-sealed at the edges to close permanently. Ink technologies can be incorporated in the package which would cause bleeding of the ink on any attempt to tamper with the package and so provide further counterfeit deterrence or at least tampering evidence. The card-like diamond package can have some deflection ability similar to a credit card or the like.

Figure 3:
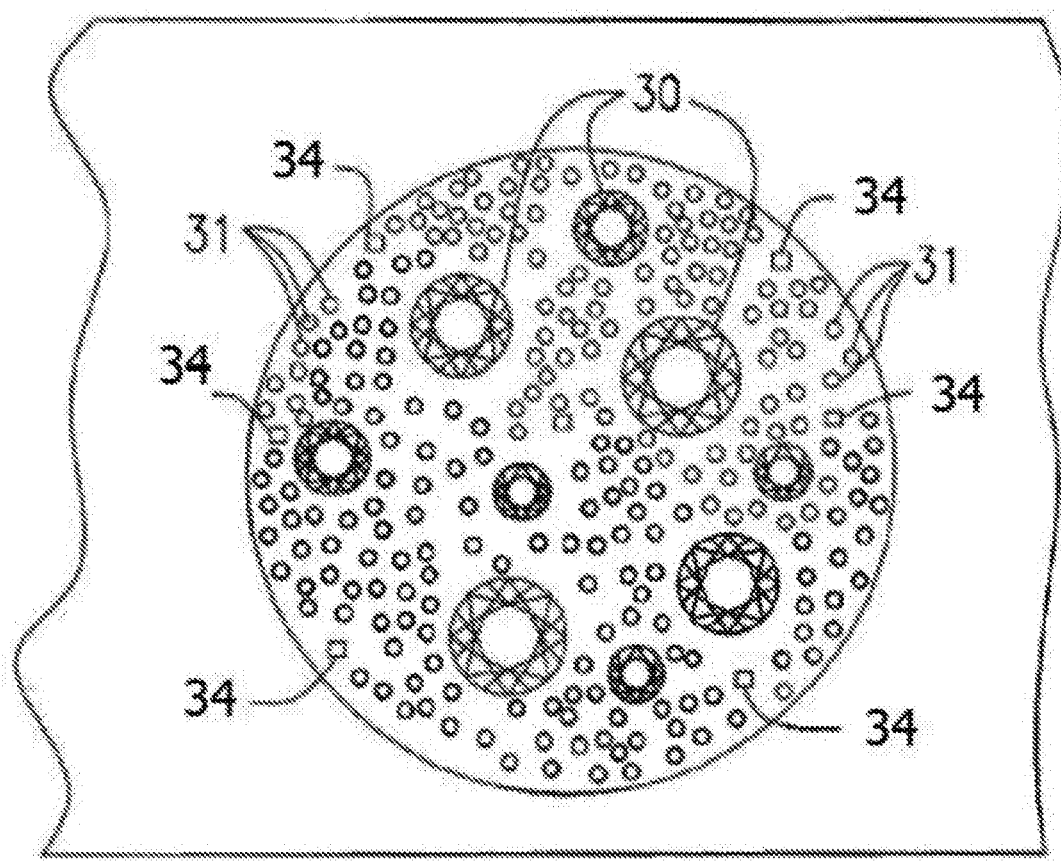
FIG. 3 shows a security measure for the diamond pouch on the smart card.

For an added security measure, reference is now made to FIG. 3 which shows the diamond pocket 35 from the front face of the diamond card showing basically the table end of the diamonds 30 and a material 31 which is interspersed between the diamonds and which is intended to provide an added security measure. Preferably, the material 31 consists of microspheres having diameters of a fraction of a millimeter, in an array of colors with some diameter variations, all admixed. When the card 10 is manufactured, these microspheres 31 are spread between the diamonds 30, preferably in a single layer. They provide a completely random 3-dimensional, visual signature which is impossible to duplicate lithographically and absolutely unique to each package. A visual high resolution photograph of the back side of the diamonds card is also registered, and each purchaser can check the package in his/her hand and compare the visual appearance with the stored image. If there was any tampering with the diamond package, it would be impossible to recreate the random microsphere distribution and unique color pattern. Simply choosing any spot of, for example, a 3 mm×3 mm area will immediately reveal whether it is identical to the original image and comprised of microspheres. The package can be provided with a few marker points 34 that allow quick orientation of the visual comparison to the real object image. Alternatively, the material 31 can be precious stone dust in various colors. Lastly, the visual authentication step can be carried out automatically by uploading a photograph taken by the mobile device 11 to the registration server 62 (FIG. 4).

Figure 4:
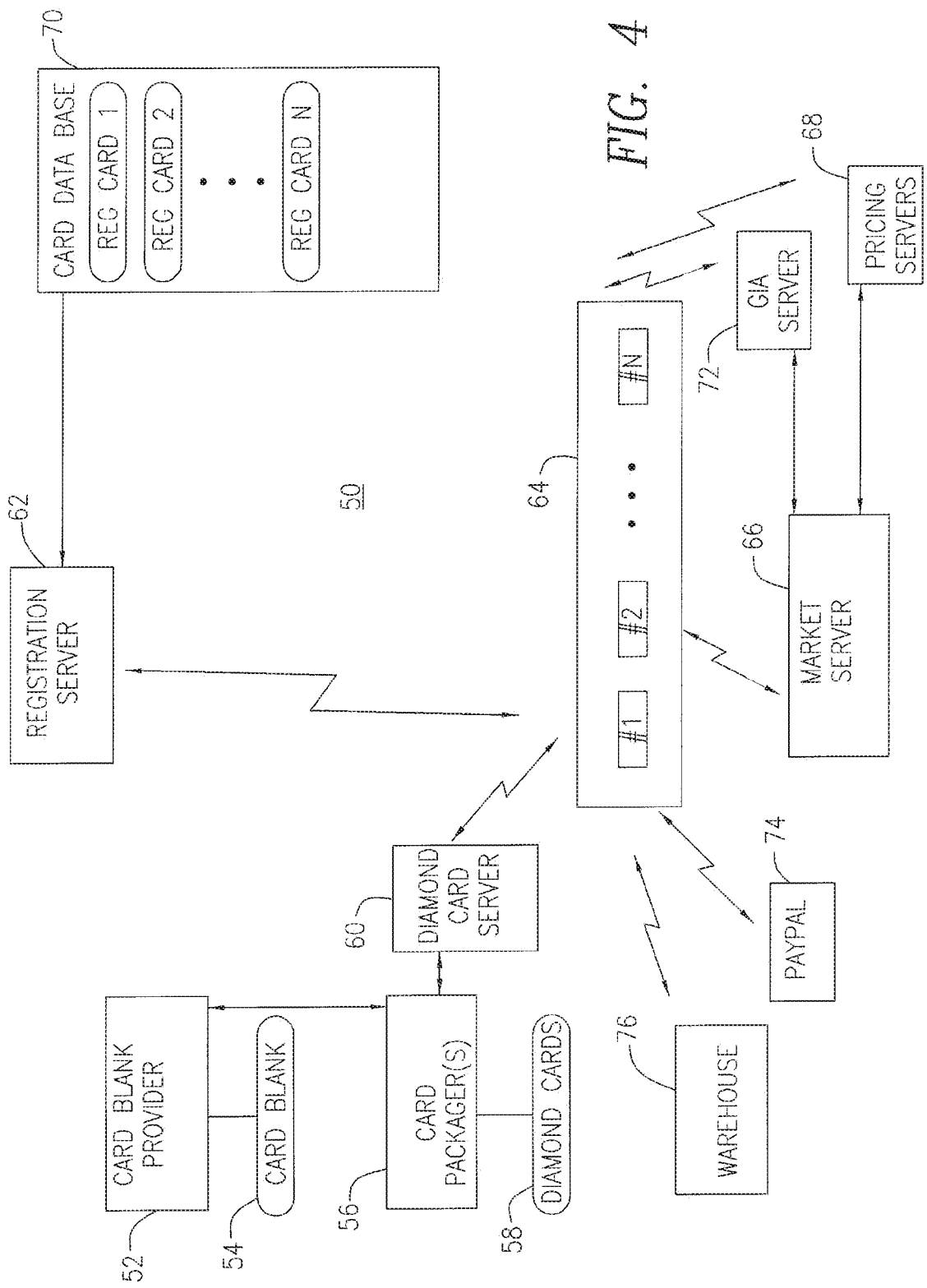
FIG. 4 is a system block diagram of the present invention.

FIG. 4 provides an overall system 50 diagram of the present invention. Thus, the card manufacturer 52 produces the blanks of the card body with the PUF chips already embedded with the various serial numbers and visual printing thereon, leaving empty the diamond pouch 26 (refer to FIG. 3). The supply of blank cards 54 are purchased by the final card packager and issuer 56 which selects a number of diamonds, for example, as indicated on the face page of the card 42 (FIG. 2a), and selects the diamonds to have an aggregate market value of say $10,000.00. This type of a card has a nominal $10,000.00 value upon issuance. Preferably, the diamond cards 58 also list a "date of issue" which indicates that it has/had the nominal value on that issue date. Also, a small pack of low point diamonds may be included with the eight main diamonds to cause the value of the card to basically equal the nominal card value on the date of issuance. These packed diamond cards 58 are then listed on the issuer's/packager's public server (i.e., diamond card server) 60. The advertised diamond packs are available for purchase by members of the public 64.

When (or even prior to) a member of the public 64 has purchased one of the diamond cards 58, that card is immediately recorded with the registration server 62 and during that process not only the PUF information is provided from the issuer 56 (or alternatively from the card manufacturer 52), but a visual high resolution photograph of the diamonds and their various GIA (Gemological Institute of America) or similar certification information are also placed and recorded on the registration server 62. The registration server 62 thereby develops a growing database 70 of diamond cards which have been purchased by members of the public 64.

The public does not necessarily have to buy the diamond packages from the issuer(s) 56. That is, as the market will develop, members of the public 64 can advertise their individual packages on the market server 66 to enable other members of the public to trade with them directly relative to these registered diamond card packs, utilizing the verification process noted above, which only requires using the mobile phones 11 to authenticate the received package(s) by communicating with the registration server 62 and verifying that the PUF chip identity and the visual images are authentic. Another form of verification comprises inspecting the physical diamonds with a loop or other magnifying device and comparing the inclusions on the diamonds in the package, and other characteristics such as their color, carat weight, cut, etc. against the GIA or other certificates also on store.

The market server 66 also allows its users to communicate with pricing servers 68 having access to pricing information databases, for example, Rappaport reports, and other data sources to complete the verification process and commercial transaction. When a member of the public 64 is satisfied that what he/she is purchasing is authentic, payment can be effected through a Paypal or other third party secured server 74 which holds the funds and pays them when authorization is provided from the member of the public 64. The warehousing facility 76 allows the members of the public 64 to store their merchandise thereat, so that they do not have to be kept at home or in private safes and the like. It should be noted that the card packager 56 may advertise to the public 64 its requirements for various diamond sizes and qualities for producing the diamond cards, which will allow the public to offer to the packager 56 the discrete diamonds for purchase, further expanding the overall market in diamonds.

The standardized packages do not have to have an initial nominal value of $10,000.00. Preferably, they will be issued at several nominal values, for example, a $10,000.00 card, a $40,000.00 card, and a $100,000.00 card. Once the cards are issued, they can be traded and prices paid for them subject to the fluctuations of the diamonds market, based on the actual diamonds in each package. Also, the number of diamonds in the package may be higher or lower than the number shown in the described embodiment.

Figure 5:
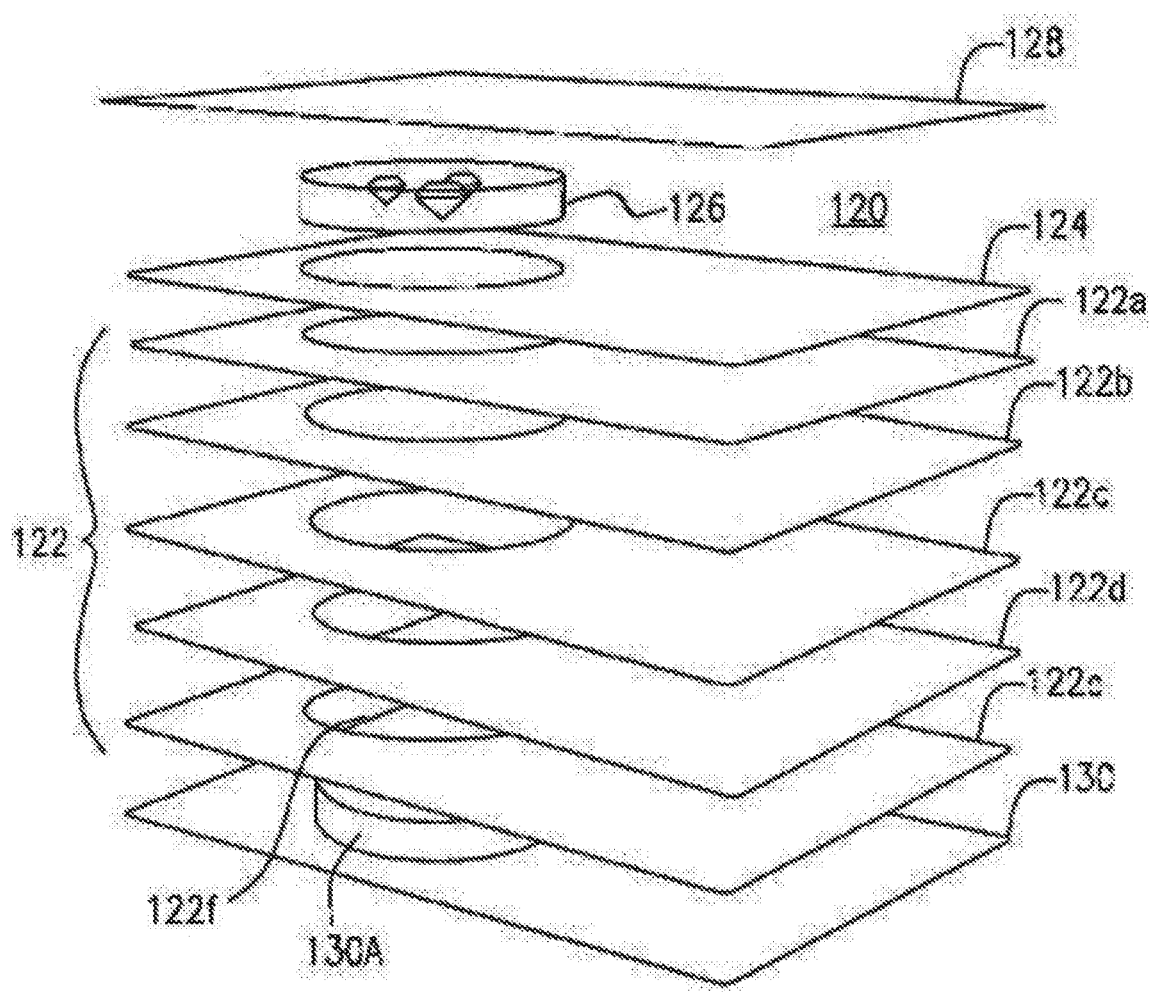
FIG. 5 is an exploded view of a smart card diamond package in accordance with a further embodiment of the invention.

Referring to FIG. 5, an embodiment of a diamond smart card 120 in accordance with the present invention may be comprised of eight sandwiched layers and a diamond cup, as described below. In FIG. 5, a core section 122 of the diamond smart card 120 comprises five layers, including a clear PVC layer 122a measuring about 0.05 mm; a white printed PVC layer 122b measuring about 0.152 mm; a white PVC layer 122c with a pocket for an RFID interface and PUF chip, measuring about 0.458 mm; a white printed PVC layer 122d measuring about 0.152 mm; and a clear PVC layer 122e measuring about 0.05 mm. The layers of the core section 122 all have a respective circular cutout 122f accommodating therein a diamond cup 126 which is a plastic injection of a PVC foam insert that holds the diamonds. The diamond cup 126 also passes through an optically clear adhesive layer 124 measuring about 0.0127 mm and is further received in a bottom layer 130 which is a vacuum formed back with a pocket 130A for the diamond cup 126 and which measures about 0.152 mm in thickness. The top of the smart card 120 is covered by an optical layer 128 of clear polycarbonate material measuring about 0.152 mm.

Figure 6:
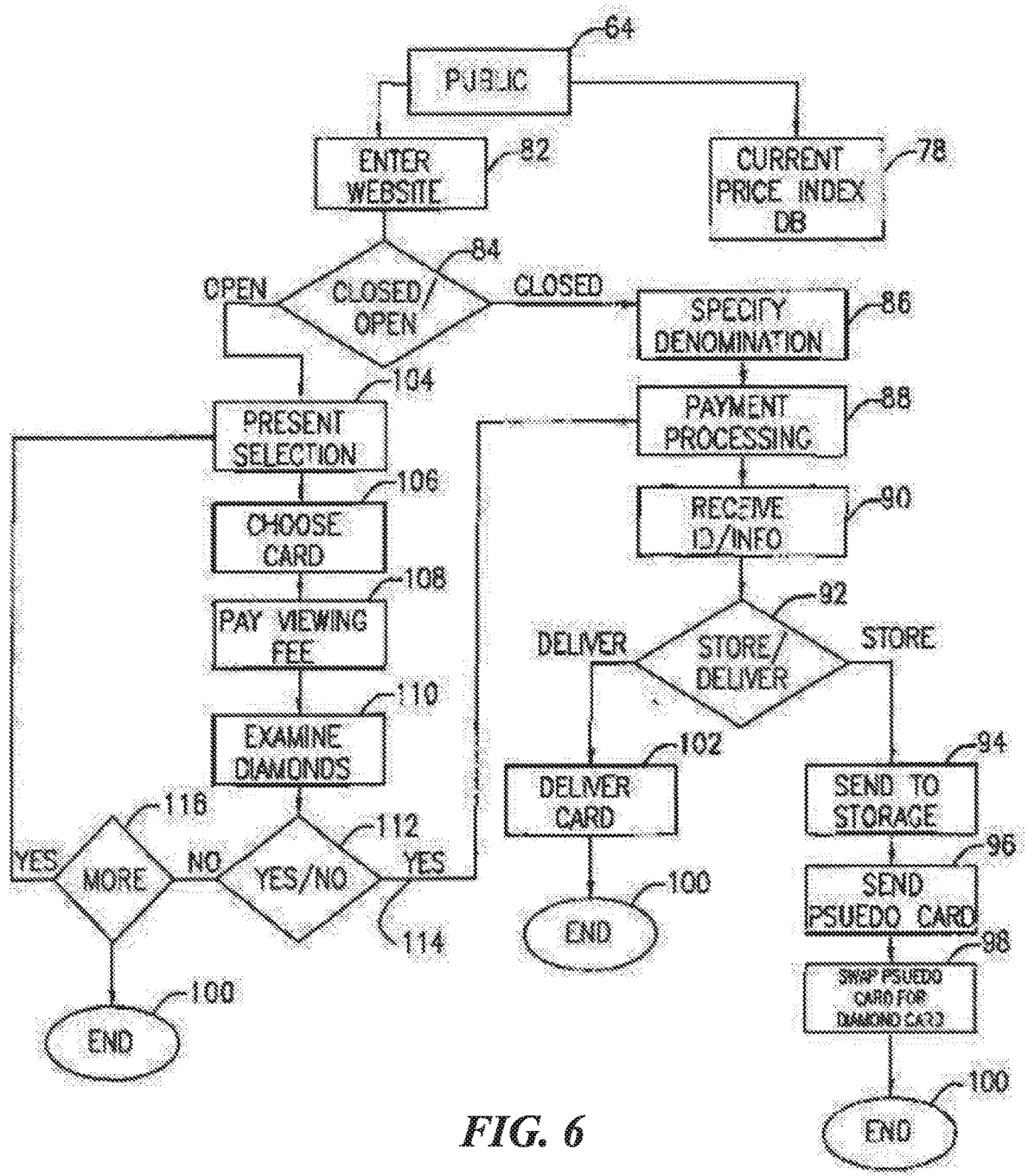
FIG. 6 is a flowchart of an algorithm in accordance with the present invention.

FIG. 6 is a flowchart of an algorithm which is intended to prevent speculation and arbitrage schemes by members of the public 64 which might interfere with the ability of evolving a true market in the standardized diamond packages of the present invention. For example, members of the public 64 might systematically query the diamond card server 60 for no other purpose than to learn the precise nature, identity and makeup of the diamonds in the diamond cards 58 that are being offered by the card packager 56. The purpose thereof might be to create a catalog of those diamonds and select out and remove from circulation specific packages which a speculator or an arbitrageur might perceive to offer a price advantage over the standardized packages.

Accordingly, the flowchart of FIG. 6 provides an optional algorithm that would prevent such speculation or arbitrage activities by presenting members of the public 64 who visit the diamond card server 60 (refer to FIG. 4) with the question (at step 82) whether they wish to buy an available diamond card on a "closed" transaction or an "open" transaction basis as indicated at decisional step 84. The preference of the invention is that people buy those cards on a "closed" transaction basis similar to the manner of purchase of rough diamonds packages offered by De Beers. However, if someone wishes to actually see the physical diamonds in a particular package using the "open" transaction, the flowchart takes the potential purchaser 64 to step 104 at which the buyer can be presented with a choice of perhaps a hundred smart cards to sift from, which may be identified only by serial numbers and issue dates and nominal values. When the purchaser picks one particular serial number, he will be shown the details of that card at steps 106, 108 and 110, upon paying a viewing fee, for example, five percent payable for the right to pre-examine and possibly reject the given card.

At step 112, the potential purchaser must indicate whether she wishes to buy the particular diamond card. If not, the potential purchaser is asked at step 116 whether she wishes to examine other diamond cards. If not, the process ends at step 100. If yes, then the process returns to step 104 and the potential purchaser is asked whether he wishes to see another card package, and so on. If, at step 112, the potential purchaser does wish to buy the particular diamond card, he proceeds along the line 114 to the paying process at step 88.

Retracing to the decisional step 84, if a potential purchaser$_{LL(1)}$ indicates that she desires a closed transaction, then at step 86, the purchaser is charged the nominal price for the card and pays for that card at step 88. Thereafter, the purchaser receives all the information fully identifying the diamonds and other information associated with the particular card at step 90. At decisional step 92, the purchaser is asked whether he wants the actual, physical card delivered to him or, instead, maintain the purchased card in storage, for example, at the warehouse 76 (refer to FIG. 4). If the purchaser opts for storage, then at step 94 that particular purchased diamond card is processed for being sent to storage. The purchaser may receive instead a counterfeit-proof, pseudo card which is associated with the actual diamond card that has been purchased. If at any time a purchaser wishes to receive the physical card, he can receive it, as indicated in step 98, by returning the pseudo card. This enables trading in the pseudo cards without the need to ship or deliver the physical diamond cards. The process ends with the step 100, as previously noted.

On the other hand, if a purchaser asks for physical delivery at decisional step 92, then, as indicated in step 102, physical delivery will be made within a set time period, for example, ten days, thereby preventing speculation and arbitrage attempts. If anyone wishes the card to be overnighted to them, then they must pay a premium; for example, five percent, which again discourages mere speculation and arbitrage activities.

The algorithm and process of FIG. 6 is, as noted above, intended to instill in the marketplace the idea that diamond cards of the same denominations are fungible and that it would be futile, as well as expensive and time consuming, to purchase these cards in order to break them apart to retrieve the physical diamonds therein for speculative or arbitrageur purposes.

As also indicated in FIG. 6, the public may also access a database 78 associated with the diamond card server 60 (or which may be accessible through other sources that publish an index of diamond prices) for cards previously issued) to obtain current prices by reference to the issue date thereof. For example, a card that was issued Feb. 10, 2014 might be indicated in the price database 78 to have gone up, say, 5.6%, thirty days later, based on benchmark records or public information that indicate for each type of stone the appreciation (or depreciation) the given diamonds have experienced since their issue date.

The cards as described above are indicated to be of a certain nominal card value as of their issue date. It may be difficult to achieve or implement that nominal card value with just the eight diamonds in the package. To solve that problem as well, the invention herein also contemplates including within the diamond cup a pack of small sized chip diamonds with an aggregate value of, for example, a few hundred dollars, so as to bring the total value of the diamond card very closely to the nominal value, on the day that the card is issued.

In this connection, also note that when a purchaser has purchased a particular card which has a nominal value of, say, $10,000, but is purchasing it sixty days after the issue date printed on the card face, one could consult the database 78 and pay a price which might be slightly higher (or lower) than the nominal value, since the diamonds in the card may actually have appreciated or depreciated in the sixty days interim. This can be done seamlessly with an APP stored on the Buyer's/Seller's mobile phone or desktop computer or tablet device, etc.

Figure 7:
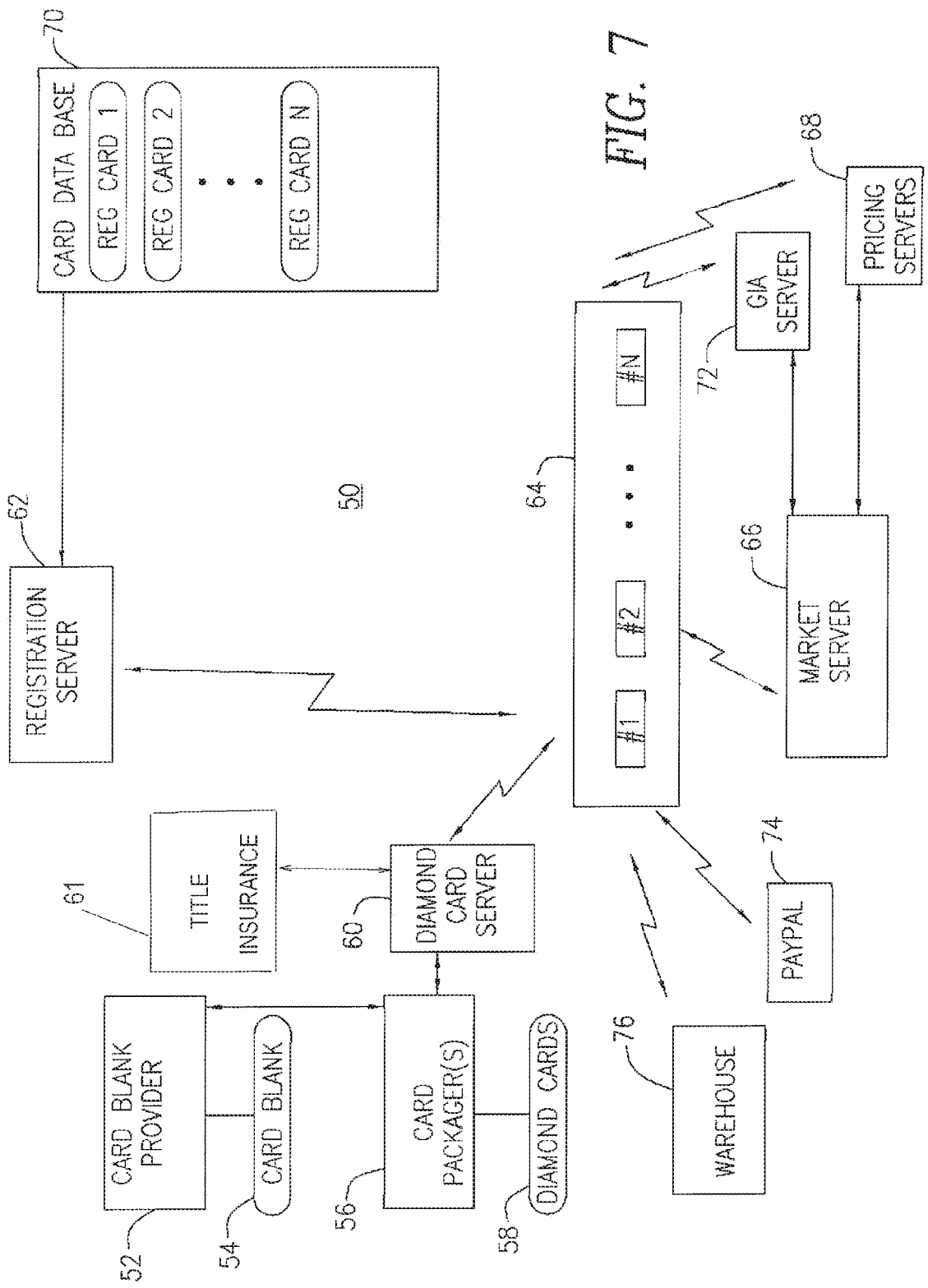
FIG. 7 is a further system block diagram of the present invention.
Figure 8A:
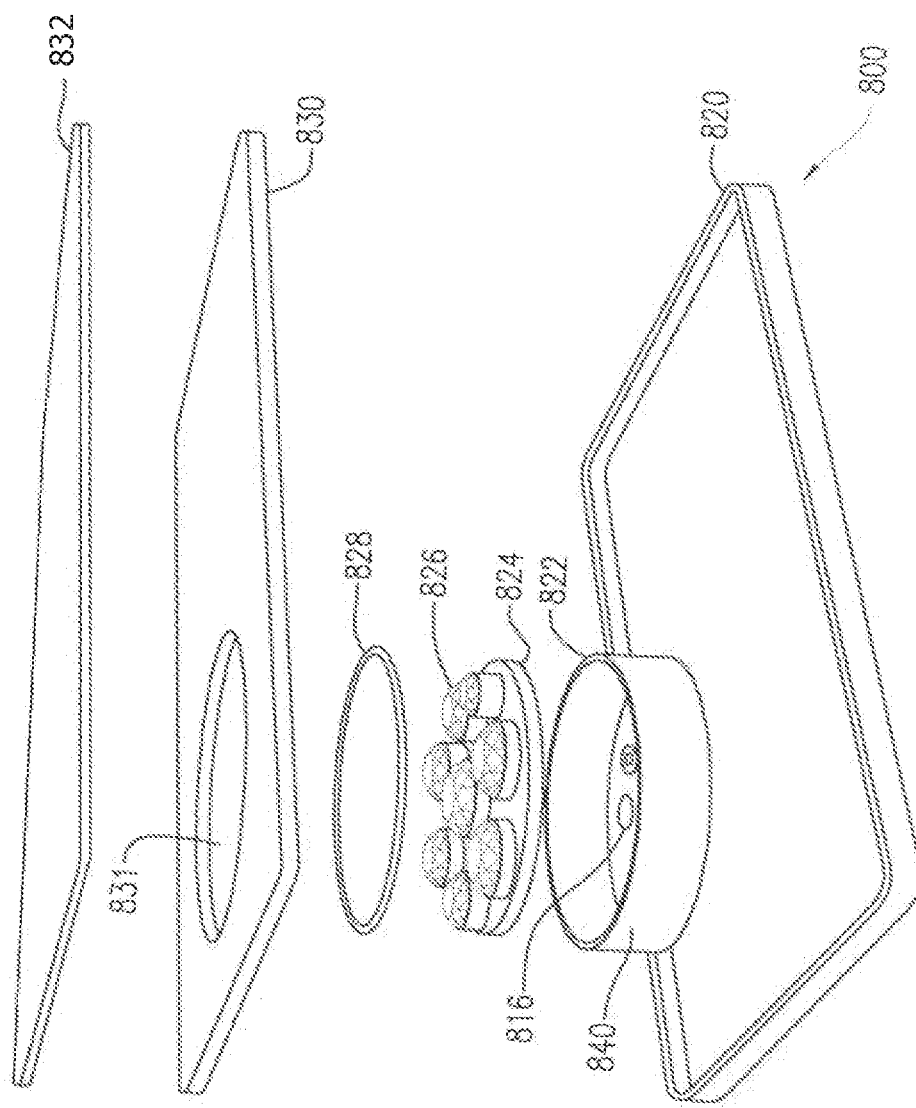
FIG. 8A is an exploded view of a further embodiment of the invention.
Figure 8C:
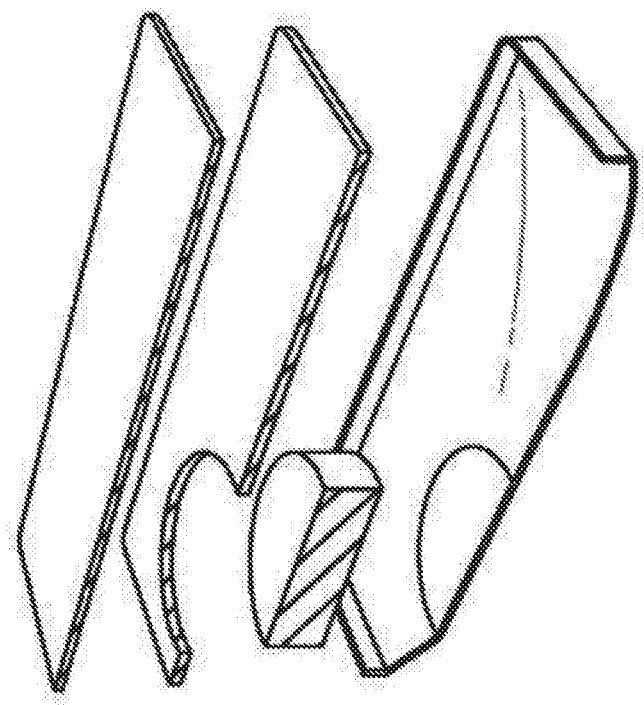
FIGS. 8B, 8C, 8D and 8E show detail of the embodiment of FIG. 8A.
Figure 8B:
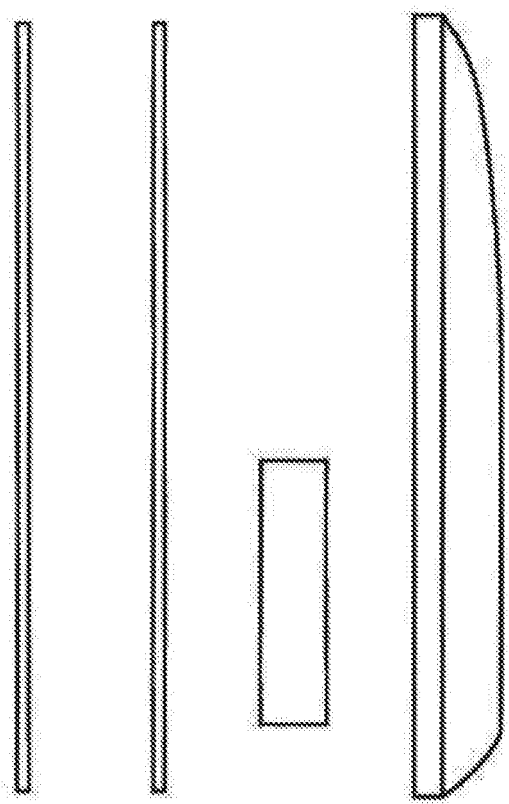
Figure 8E:
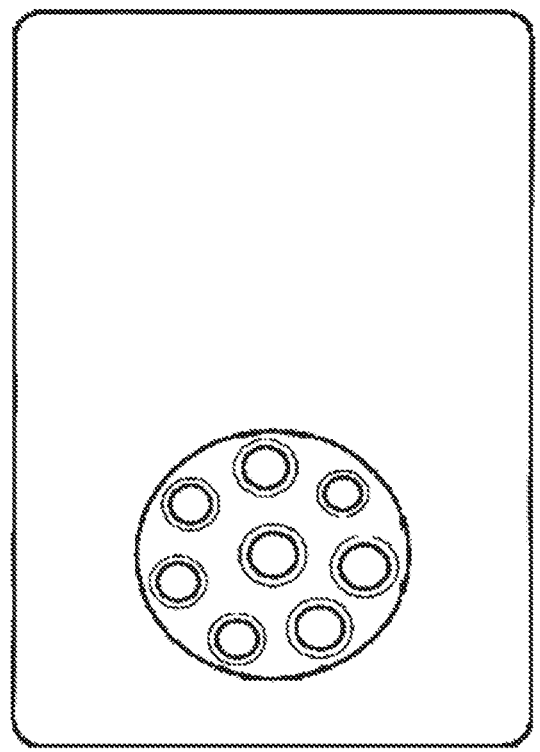
Figure 8D:
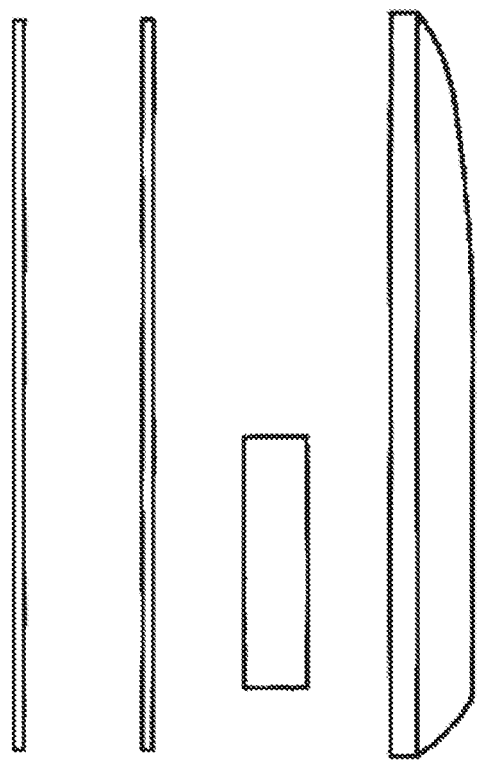
Figure 9B:
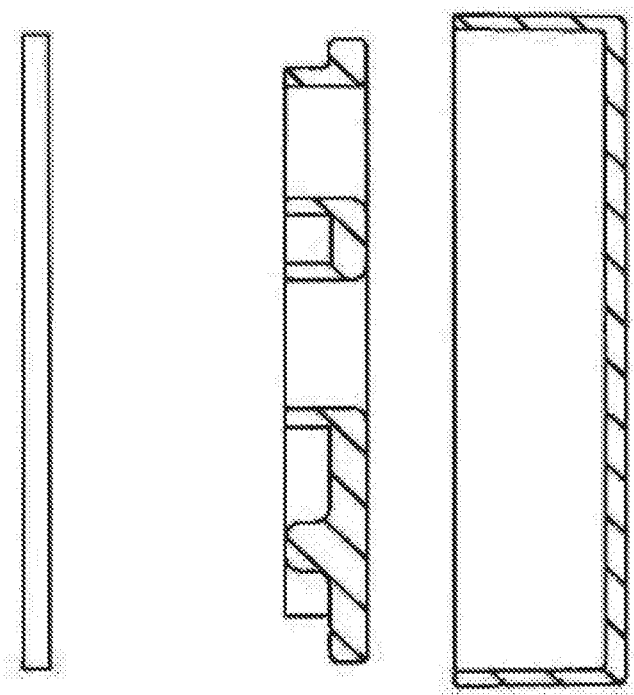
FIGS. 9A, 9B, 9C and 9D show still further details of the embodiment of FIG. 8A.
Figure 9A:
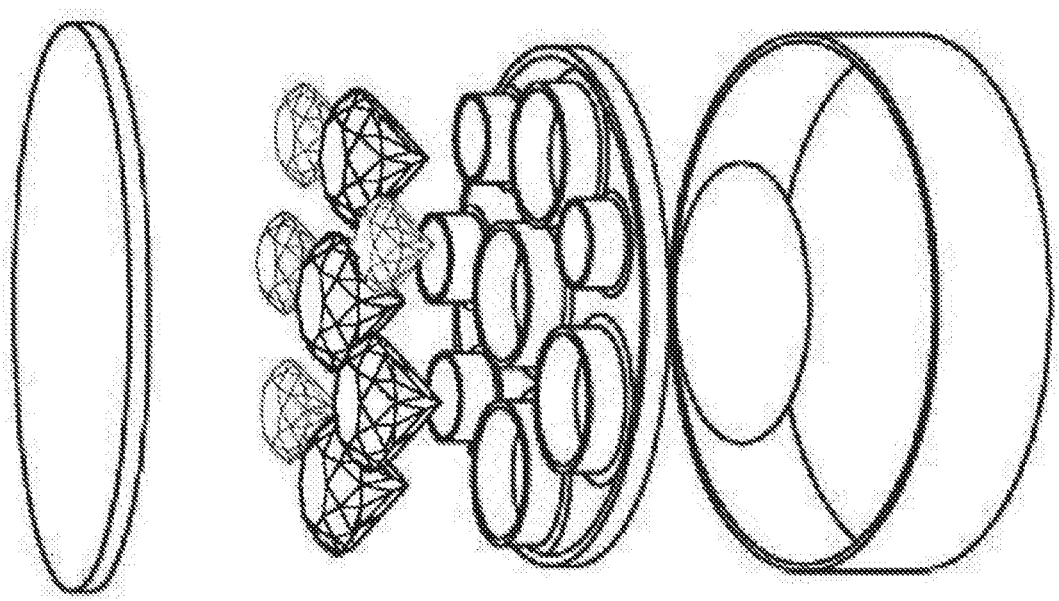
Figure 9D:
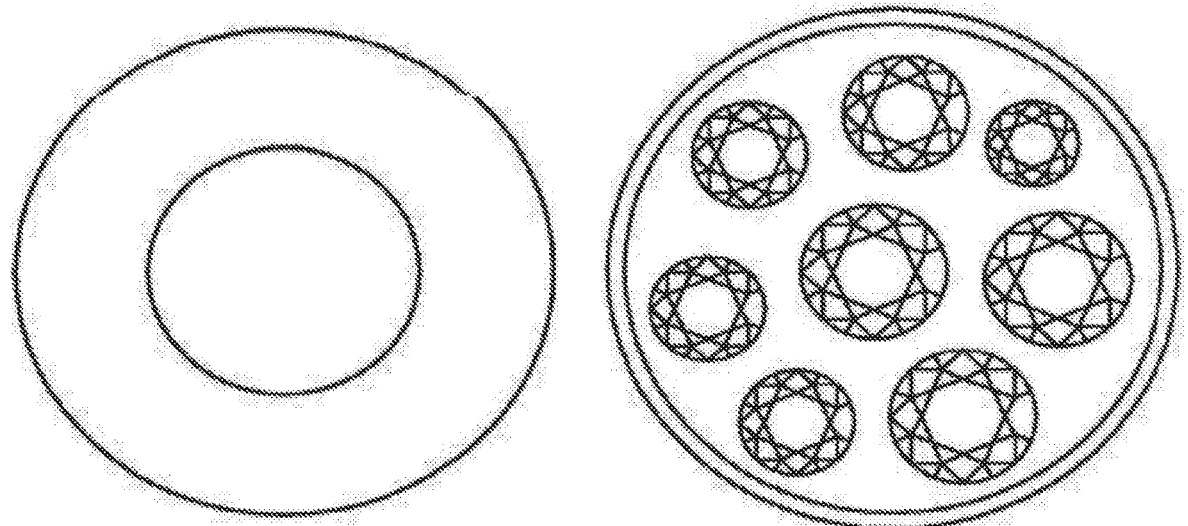
Figure 9C:
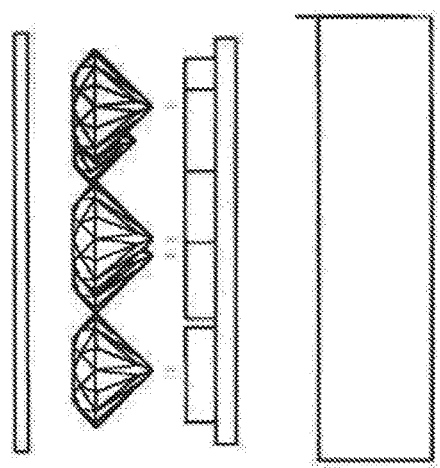

Referring to FIG. 7, in accordance with a further embodiment of the invention, the overall system 50 adds a title insurance facility or module 61 which can be associated with the diamond card server 60. Purchasers of the diamond cards 58 will be provided with title insurance which protects them regarding the authenticity and other attributes of the diamond cards. Alternatively, members of the public 64 can arrange their own title insurance and pay for it themselves, if they exchange diamond cards amongst themselves.

Referring to FIG. 8, in accordance with a further embodiment of the invention, a diamond card 800 comprises a base 820 in a form of a ceramic back, with a peripheral wall (preferably rectangular) which houses at the left side thereof, a ceramic cup 822 at the bottom of which may be provided the PUF chip 840 with its PUF chip antenna or NFC facilities 816 which are located at the bottom of the ceramic cup 822. A diamond holder 824 sits at the bottom of the ceramic cup 822 and has the holders/settings for holding a plurality of diamonds 826. The ceramic cup 822 is closed off by a sapphire or a gorilla glass cup cover 828 with a card core 830 over it with an exposed window 831. Finally, a sapphire or a gorilla glass outer cover 832 seals in and closes off the ceramic back in a manner which will create visible marks and which will destroy the PUF circuit if any attempt is made to penetrate into the card to replace or tamper with the diamonds therein.

FIGS. 8*a* through 8*d* show details of the diamond card embodiment of FIG. 8.

FIGS. 9*a* through 9*d* show further details of the diamond card embodiment of FIG. 8.

The diamond card, which may be known by its various trademarks, including vULT, SECURED PASSPORT, DIAMOND COIN and other trademarks is a globally portable store of wealth, based on laboratory-certified, investment-grade diamonds. The card is small enough to fit discretely in a pocket and easy to authenticate and price. The diamond cards can be conveniently liquidated anywhere in the world.

The diamond package seals laser inscribed diamonds inside a robust ceramic and advanced electronic device the size of a credit card. Wireless integrated circuits fused inside, a micro-printed signature, laser inscription and other technology, electronically and physically characterize the state-of-the-art diamond instrument. The diamonds cards can be opened and destroyed to recover the diamonds, but cannot be modified, duplicated or imitated.

The diamond card can be viewed in part as an appreciable hard asset, a diamond investment, also as a commodity and, in addition, as a beautiful collectible card which can function as a secure, portable, private liquid investment. The combination of certified diamonds, portability, authentication and security, along with transparent pricing and global liquidity defines the product. It is a compact, portable asset marketable through an exchange and a transferable store of wealth.

As described above, the invention uses PUF (physical unclonable function) chips to provide unique characteristic in each diamond card, that can be checked by the chip circuitry responding to unique and random challenge codes. The two antennas provide a wireless communication and access to the PUF chip and their NFC and RFID technology provide electronic and visible manufacturing complexity that is difficult if not impossible to mimic. Similarly, the inscribed serial number is visible and easily read for purposes of identification in inventory taking. The code itself may be chosen from among the chip's production serial number, randomly assigned or assigned based on its type, or year of packaging and other relevant information. Overall, the physical inscription process is difficult to mimic or alter being that it is located under the surface of the card.

In accordance with a preferred method of fabrication, the instant invention has been reduced to practice, utilizing the following steps:

1. A smooth and firm silicon mold formed with a high polished steel positive mold and forming a matrix of disc-shape cavities is initially prepared. Each cavity, which may be referred to herein as a puck cavity, preferably has a dimension of about 30 mm in diameter and 8 mm in depth.
2. Each cavity is filled with a quantity (preferably 0.75 cc) of a resin top layer, preferably using a two-part optically clear urethane resin. This layer forms a lens and the process allows the lens layer to cure and be stored for later use.
3. At a time of assembly, a quantity, preferably 1.5 cc, of resin is injected at a depth equal to the dimension of diamonds from the table to the crown.
4. Several diamonds are placed into each puck position, table down and arranged artfully.
5. A quantity of microspheres is sprinkled into the resin in a manner that ensures separation and sinking to the bottom. Preferably, the microspheres are 500 micrometer red glass microspheres at 2.50 g/cm3. These are sprinkled into the resin. The number of microspheres preferably numbers about 8 to 15 microspheres, but clearly more or less can be used.
6. Each puck location is thereafter filled with more resin in a quantity sufficient to cover the culets of the diamonds. The resin is then cured for about one hour.
7. A white resin layer is placed atop the previously cured layer and an NFC tag is placed therein and covered with white resin to an exact total height specified, using a measuring laser to control the fill volume. Preferably, 0.5 cc of the white resin is injected. The white resin is cured for about six hours, or for about two hours, when an oven is used.
8. The puck with the diamonds, microspheres and NFC tag therein is removed from the silicon mold.
9. Each diamond puck is subsequently mounted in a card container with an RFID card, as previously described.

When formed as described above, the diamond card of the present invention provides various benefits including an attractive consumer display, an ability to positively identify individual stones via their inscriptions and defect characteristics and high portability in that the diamonds are packaged in a small disc-shaped puck of about 30 mm×9 mm.

The embedded NFC tag preferably comprises a 25 mm wound antenna and an NXP Semiconductors Mifare DESFire EV1 2K chip, which supports 848 Kbits/s data transfer through NFC, 168 bit 3 DES hardware encryption and 2K of memory.

This chip is programmed with a server challenge key, the public encryption key to the card's authentication service, and information about the DIAMOND COIN puck. During an enrollment of any given diamond card, access circuitry in the EV1 is "burnt out", making it impossible for an attacker to alter the encrypted program or content.

The encryption data for the EV1s is managed by a Safenet Luna HSM (Hardware Security Module). The authentication proof never leaves the encrypted hardware of this equipment. The card's Authentication App is a mobile phone App which enables communication between the EV1 chip and the system's Server, enabling collecting authentication evidence, such as the location of photographs of the particular DIAMOND COIN.

The basic authentication process proceeds as follows:

1. With the phone's NFC feature enabled, the user scans the vULT card, and communication with the NFC tag is opened. Basic information such as the serial number, product model and stone count is read by the app.
2. The EV1 challenges the vULT authentication server and provides its serial number using the server's public key.
3. The authentication server responds to the challenge using that EV1 's public encryption key.
4. Through this fully encrypted connection, the server sends a random challenge to the EV1, which returns a unique response. If correct, the EV1 is authenticated.

5. As part of the authentication process, the user takes a new photo of the DIAMOND COIN with the vULT Authentication App. If the expected number of diamonds was detected by the app's analysis, through the encrypted connection, this photo is uploaded to the Authentication Server.

Using an image analysis system, the sample image is analyzed and compared to a reference photo of the particular DIAMOND COIN taken during manufacture.

The count, size and elective positions of the diamonds, and the count and relative positions of every taggant is statistically compared between the original and the sample. When a total match score is achieved, which is deemed to be sufficient for authentication, then the images and, indirectly, the particular DIAMOND COIN is authenticated.

Thereby, the DIAMOND COIN of the present invention provides the additional benefits of wireless authentication, via smartphone NFC, of the embedded, encrypted silicon chip. The product is highly tamper resistant and tamper evident. The taggants randomly embedded in the resin form a unique visual fingerprint. The exact geometry of the diamonds and the taggants which have been pre-photographed and which comport to a reference are virtually impossible replicate.

Figure 10A:
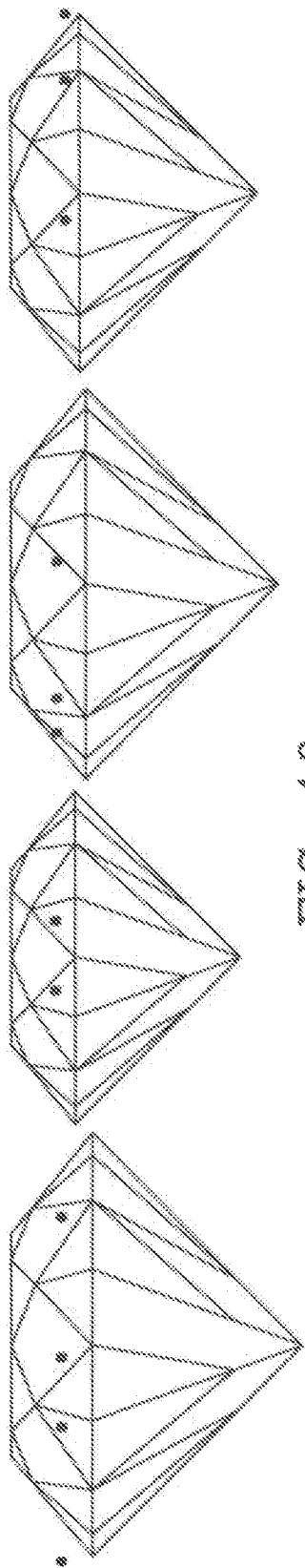
FIG. 10A is a diagrammatical side view showing a preferred embodiment of the invention.
Figure 10B:
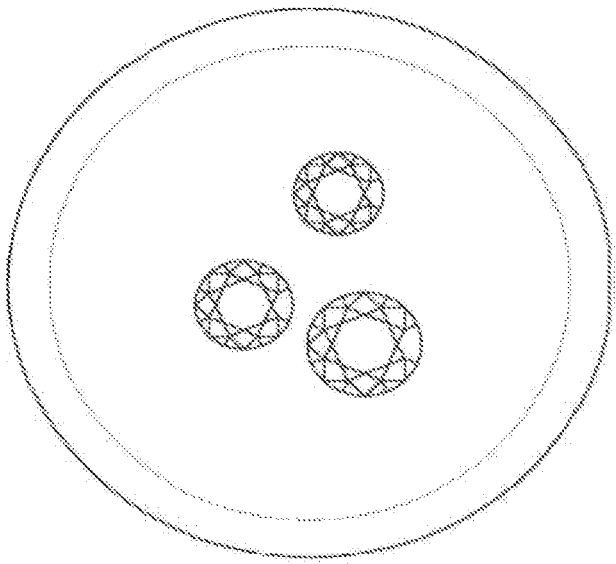
FIG. 10B is a top view of a portion of FIG. 10A.

With reference to FIG. 10a, which is a side view of a preferred embodiment of the invention, one can note the top layer which forms the lens, and the next layer in which the entire diamonds are embedded, with the microspheres shown at a location above the pavilion, along the crown sections of the diamonds. In the partial top view of FIG. 10b, one can note three diamonds and eleven red microsphere taggants, the locations of which is random and statistically impossible to replicate or counterfeit.

As described above, the diamond packaging technology and its accompanying system including the various web-based computer servers and entities will be recognized by the reader to have created a new paradigm for the owning, marketing, exchanging diamond merchandise in a manner which very closely mimics the public exchanges for securities, coins, gold bullion and the like. The invention will enable individuals to invest part of their assets in diamonds and the marketplace for diamonds will grow much larger and allow individuals access to a new investment vehicle. The card technology also has a value as a store of wealth and method of exchange for valuables other than diamonds.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

I claim:

1. A method for authenticating a portable diamond package with a mobile device, comprising:
   providing, by an authentication device via the mobile device, a connection challenge to an authentication server, the authentication device embedded within the portable diamond package and located inside a package body, the portable diamond package having one or more diamonds located in the package body, wherein the package body is configured to reveal any tampering with the one or more diamonds located in the package body and the authentication device comprises a physical unclonable function (PUF) chip configured to output a unique algorithmic response;
   establishing an encrypted connection between the authentication device and the authentication server responsive to receiving, at the authentication server, a response to the connection challenge from the authentication device;
   receiving, by the mobile device, an authentication challenge from the authentication server, the authentication challenge configured to verify the authentication device of the portable diamond package;
   interrogating, via a near field communication (NFC) interface of the mobile device, the authentication device of the portable diamond package with the authentication challenge;
   receiving, by the mobile device from the authentication device, the unique algorithmic response to the authentication challenge, wherein the unique algorithmic response indicates authenticity of the portable diamond package;
   capturing, by a camera of the mobile device, an image of the portable diamond package;
   forwarding, by the mobile device, the unique algorithmic response to the authentication server;
   sending, by the mobile device to the authentication server, a reference image of the portable diamond package;
   comparing, by the authentication server, cuts of a first set of diamonds in the image to cuts of a second set of diamonds in the reference image of the portable diamond package previously stored at the authentication server; and
   responsive to the unique algorithmic response matching an expected response known to the authentication server and the comparison yielding a total match score deemed sufficient for authentication, receiving a diamond package authentication confirmation on the mobile device.

2. The method of claim 1, wherein the PUF chip is communicatively interfaced with a transceiver adapted to interface with the mobile device.

3. The method of claim 2, wherein the portable diamond package further comprises an antenna that uses near-field-communication (NFC) to interface with the mobile device.

4. The method of claim 1, further comprising:
   receiving, from the authentication server, the response to the connection challenge encrypted using a public encryption key of the authentication device.

5. The method of claim 1, wherein the expected response known to the authentication server is based on one or more preregistered parameters of the authentication device.

6. The method claim 5, wherein the one or more preregistered parameters of the authentication device are based on micro-variation of the PUF chip.

7. The method of claim 1, wherein the mobile device comprises a smart phone having installed in a memory of the smart phone an application configured to communicate encrypted data with the authentication server.

8. A method for authenticating a portable diamond package with an authentication server, comprising:
   providing, by an authentication device via a mobile device, a connection challenge to the authentication server, the authentication device embedded within the portable diamond package and located inside a package body, the portable diamond package having one or more diamonds located in the package body, wherein the package body is configured to reveal any tampering with the one or more diamonds located in the package body and the authentication device comprises a physical unclonable function (PUF) chip configured to output a unique algorithmic response;

establishing an encrypted connection between the authentication device and the authentication server responsive to receiving, at the authentication server, a response to the connection challenge from the authentication device;

generating, by the authentication server, an authentication challenge configured to verify the authentication device of the portable diamond package;

receiving, by the authentication server from the authentication device via the mobile device, an algorithmic response to the authentication challenge indicating authenticity of the portable diamond package and an image of the portable diamond package captured by a camera of the mobile device;

comparing, by the authentication server, cuts of a first set of diamonds in the image to cuts of a second set of diamonds in a reference image of the portable diamond package previously stored at the authentication server;

determining whether the algorithmic response from the authentication device match an expected response known to the authentication server; and responsive to the algorithmic response matching the expected response and the comparison yielding a total match score deemed sufficient for authentication, sending a diamond package authentication confirmation to the mobile device.

9. The method of claim 8, further comprising:
storing in a database of the authentication server an identifier associated with the portable diamond package and one or more preregistered parameters of the authentication device, wherein the expected response known to the authentication server is based on the one or more preregistered parameters.

10. The method of claim 8, wherein the PUF chip is communicatively interfaced with a transceiver adapted to interface with the mobile device.

11. The method of claim 10, wherein the transceiver uses near-field-communication (NFC) to interface with the mobile device.

12. The method of claim 8, further comprising:
sending, from the authentication server to the mobile device, the response to the connection challenge encrypted using a public encryption key of the authentication device.

13. The method claim of 8, wherein the expected response known to the authentication server is based on one or more preregistered parameters of the authentication device.

14. The method of claim 13, wherein the authentication challenge is randomly generated.

15. The method of claim 13, wherein the one or more preregistered parameters of the authentication device are based on micro-variation of the PUF chip.

\* \* \* \* \*

UNITED STATES PATENT AND TRADEMARK OFFICE
CERTIFICATE OF CORRECTION

| | |
|---|---|
| PATENT NO. | : 11,864,642 B1 |
| APPLICATION NO. | : 16/774896 |
| DATED | : January 9, 2024 |
| INVENTOR(S) | : Cormac L. Kinney |

It is certified that error appears in the above-identified patent and that said Letters Patent is hereby corrected as shown below:

On the Title Page

Column 1, page 2, item (63) (Related U.S. Application Data)), "continuation of application No. 14/619,633, filed on Feb. 11, 2015, now abandoned." should read -- Which claims the benefit of provisional application No. 62/022,365, filed on Jul. 9, 2014, now abandoned, and provisional application No. 61/938,923, filed Feb. 12, 2014. --

Signed and Sealed this
Eighth Day of October, 2024

Katherine Kelly Vidal
*Director of the United States Patent and Trademark Office*